Sept. 3, 1968 K. V. JAHNS ET AL 3,400,219

REMOTE STATION APPARATUS FOR REMOTE CONTROL SYSTEM VIA TELEPHONE LINE

Filed June 23, 1965

INVENTORS
Kenneth V. Jahns
Richard C. Buetow

Mueller, Aichele & Rauner

ATT'YS.

United States Patent Office 3,400,219
Patented Sept. 3, 1968

3,400,219

REMOTE STATION APPARATUS FOR REMOTE CONTROL SYSTEM VIA TELEPHONE LINE

Kenneth V. Jahns, West Chicago, and Richard C. Buetow, Mount Prospect, Ill., assignors to Motorola, Inc., Franklin Park, Ill., a corporation of Illinois Filed June 23, 1965, Ser. No. 466,309
6 Claims. (Cl. 179—2)

ABSTRACT OF THE DISCLOSURE

Remote control system responsive to direct current potentials of different amplitudes and polarities on wire line, and including a plurality of control devices responsive to alternating current signals. An oscillator provides alternating current signals to diode gates which selectively apply the signals to the control devices. The potential on the wire line is applied to the gates to overcome the reverse bias thereon so that the alternating current signals actuate the control devices.

The invention relates to remote control systems, and more particularly to a solid state decoder for decoding direct current control voltages applied over a wire control line.

Presently used systems for remote control utilize current sensitive relays with isolated coils and routing diodes for selecting the desired switching circuit in accordance with value and polarity of the control direct current. These relays have moving parts carrying contacts, which contacts during operation become pitted and dirty, and the control function sometimes is falsified. It is difficult to simplify systems which are so equipped because of the moving parts of the relays. Also, because the relays cannot be reduced in size beyond a required minimum, the size of the control device essentially depends on the size of the relays.

It is an object of this invention to provide a remote control system operating from direct current (DC) signals having a simple and inexpensive circuit for decoding the control information.

Another object of this invention is to provide an improved decoder which easily can be adapted to provide many different control functions.

A further object of this invention is to provide a remote control system with a solid state decoder maintaining DC isolation of the transmission line.

A feature of this invention is the provision of a system for decoding a DC control signal, comprising reverse biased rectifier means acting as gates and operating when a DC control signal is applied to overcome the reverse bias to transfer an alternating current (AC) signal to control devices.

A further feature of the invention is the provision of a remote control system for a base station radio transmitter including an oscillator applying an alternating current wave to a plurality of gates, which are reverse biased by potentials derived from the oscillator, and selectively rendered conducting by direct current voltages applied thereto over a wire line, with the alternating current wave being selectively transferred by the gates to provide selective control of a plurality of functions at the transmitter.

Figure 1:
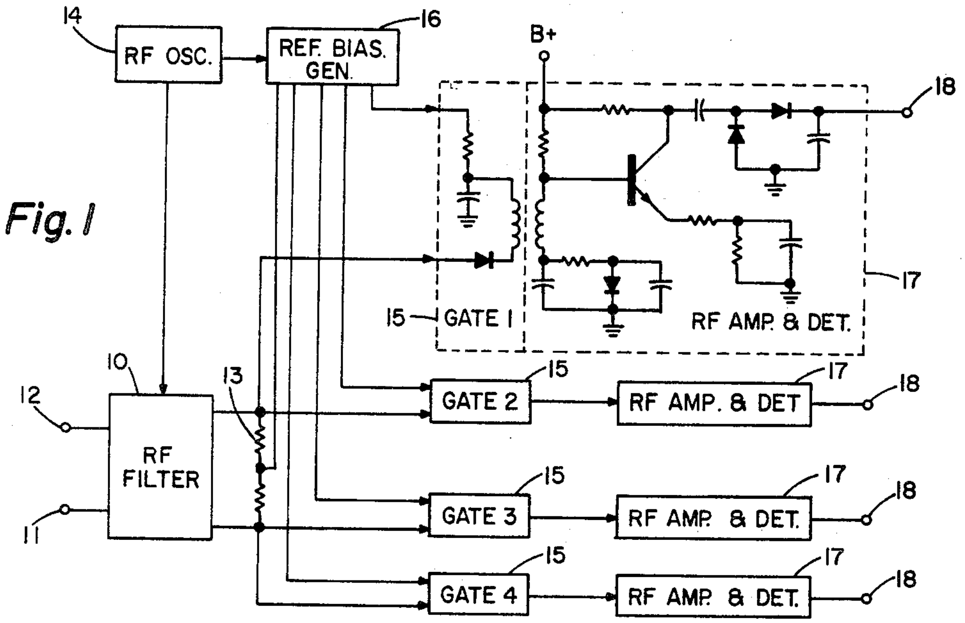
Figure 2:
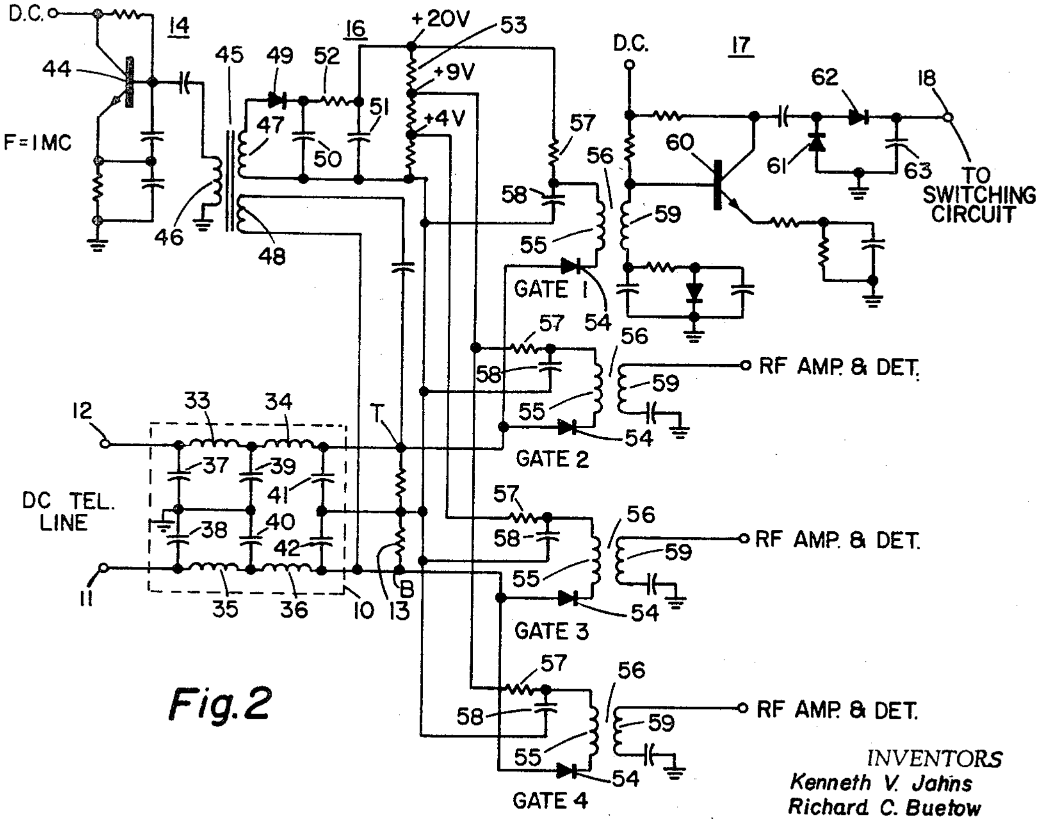

The invention is illustrated in the accompanying drawings in which:

FIG. 1 is a block diagram of the remote control system in accordance with the invention; and FIG. 2 illustrates an embodiment of the remote control system using gate means in accordance with the invention.

In brief, the present invention may be used advantageously in any remote control system, such as for a radio base station, for providing station function control by remotely generated direct current signals transmitted through a telephone or other wire line. This telephone line is connected through a radio frequency (RF) filter circuit which prevents RF from appearing on the external telephone line connection, and also applies audio signals between the base station and the central station. The RF is generated by an oscillator and is supplied at the output of the RF filter and appears at the output load superimposed on the DC control signal transferred through the RF filter. This output load is connected to any number of gates each of which respond to a fixed value and polarity of the direct current control. Each of these gates comprises a transformer with a primary and a secondary winding, and a rectifier series coupled to the primary winding. Each rectifier is reverse biased by a different fixed bias potential. The bias potentials may be derived by rectifying the RF output of the oscillator and applying the same to a potential divider. The secondary winding of each transformer is coupled to the input circuit of an RF amplifier and transfers the RF to this amplifier when the direct current control signal overcomes the reverse bias to render the rectifier conductive. Thus, the RF amplifier is selectively fed with the RF signal, which after its amplification is rectified and supplied to a switching circuit.

Referring now to the drawings, in FIG. 1 there is illustrated a remote control system including an RF filter 10 adapted to be connected by terminals 11 and 12 with a telephone line. A line terminating load 13 is coupled to the RF filter output, having a center tap connected with a reference potential. An RF oscillator 14 is provided for supplying an RF voltage at the output of the RF filter to the line terminating load, in order to add the RF to a direct current control signal transferred from the telephone line through the RF filter. The opposite ends of the load 13 are coupled to four gates 15, which are coupled between the terminating load and a reference bias generator 16. The RF oscillator 14 is connected to the reference bias generator 16 for suppling energy to the reference bias generator which sets up fixed bias voltages of different values. The gates are arranged so that direct current control signals at fixed voltage levels and polarities will overcome the fixed reverse bias of each gate rendering the gate conductive. The output of each gate is connected to an RF amplifier and detector 17 for providing an output signal at an accompanying terminal 18 for the following circuitry.

In FIG. 2 there is illustrated the complete circuit diagram of an embodiment of the remote control system. Input terminals 11 and 12 are adapted to be connected to a telephone line which transfers DC control signals. The input terminals are connected to a symmetrical low-pass filter 10 comprises series inductors 33, 34, 35 and 36, and shunt capacitors 37, 38, 39, 40, 41 and 42. The junctions of the capacitors 37 and 38, and capacitors 39 and 40 are connected to ground. The junctions of the capacitors 41 and 42 are connected to the reference potential. The output of the low-pass filter is connected to a line terminating load 13, the center tap of which is connected to the reference potential.

An RF oscillator 14, which oscillates e.g. at 1 mc. frequency, is provided including a transistor 44 and an output transformer 45 with a primary winding 46 and two secondary windings 47 and 48. The winding 48 is connected with the opposite ends T, B of the line terminating load 13 for continuously delivering the RF frequency to the load. The DC control signal is also applied from filter 10 to the load 13, and the RF signal is superimposed on the direct current signals. The winding 47 represents the input circuit of a reference bias generator 16 which comprises a diode 49, a low-pass filter including capacitors 50 and 51 and resistor 52, and an output load resistor 53 with several taps which provide different fixed bias voltages, e.g. 4, 9 and 20 volts.

Each opposite end of the line terminating load 13 is coupled with two gating circuits, each including a diode 54 series connected with a primary winding 55 of a transformer 56 and a resistor 57 connected to one of the taps of the load resistor 53. The voltage from resistor 53 reverse biases each diode 54 according to the voltage at the tap with which the gating circuit is connected. A shunt capacitor 58 is connected from the juction of the primary winding 55 and resistor 57, to the reference potential.

The secondary winding 59 of the transformer 56 is part of the input circuit of an RF amplifier and detector circuit which is coupled to each gating circuit. Each RF amplifier comprises a transistor 60, the base of which is connected with the secondary winding 59. The RF amplifier is built up in known manner such that it has enough gain to provide a certain amount of limiting of the amplified signal at its output. The signal is then rectified by a voltage doubler detector including two diodes 61, 62, and a capacitor 63. The diodes 61 and 62 are arranged to provide a signal at an output terminal 18 of a digital 1 or 0 for the following circuitry.

Referring now more particularly to the operation of the remote control system, a direct current control signal of a special value and polarity is supplied through the telephone line to the terminals 11 and 12 for each control function. The DC control signal appears at the line terminating load 13 and causes an equal voltage drop at each portion of the line terminating load resistor 13, but of opposite polarity with respect to the reference potential. At the same time also a fixed level RF signal is provided through secondary winding 48 across the line terminating load resistor 13. The RF across the load resistor is filtered from the telephone line by the RF filter 10.

The RF and DC control signals are applied to each diode 54 of the gating circuits, which are normally in the back biased, or high impedance state. Because the diodes 54 are back biased with different fixed voltages, each applied direct current control signal overcomes only such diode that has a bias voltage less than the value of the direct current control signal. By this the various diodes 54 are selectively rendered conductive to gate RF into the transformer 56 connected thereto. At the same time, some of the other diodes those with greater bias and diodes detecting current of the other polarity are still reversed biased. The gated RF is transferred by the secondary winding 59 to the base of transistor 60 and amplified enough to provide a limited signal at the collector of transistor 60. The collector feeds the voltage doubler-detector which provides a digital 1 in the form of a voltage, when the gated RF is amplified, at the output terminal 18 for supplying the following circuitry (not shown), and a digital 0 when no RF is transferred to the amplifier. Thus the DC isolation of the transmission line is maintained for each status of operation of the remote control system.

Referring now more particularly to the operation of the diode gates, in the described embodiment of the invention gate 1 and gate 4 are biased with a voltage of 9 volts, gate 2 is biased with 20 volts and gate 3 is biased with a voltage of 4 volts. If now for example a DC control signal is supplied to the load 13 of such value and polarity that a voltage of 16 volts is developed across each half of the load 13 with a positive polarity at the end T and a negative polarity at the end B with regard to the reference potential respectively, the reverse bias of 9 volts at diode 54 of gate 2 is overcome. The diode 54 of gate 2 therefore applies RF through transformer 56 to transistor 60 of the RF amplifier and detector. The control voltage is not sufficient to overcome the 20 volts bias on gate 1, and is of the wrong polarity to overcome the bias on gates 3 and 4. These diodes are therefore still reversely biased and do not conduct.

In case that the value of the voltage across each half of the load 13 is 5 volts and the polarity is opposite with regard to the forementioned example, the negative polarity of the voltage is applied at the end T and the posiitve polarity at the end B. The positive signal from end B overcomes the 4 volts bias voltage of gate 3 and renders its diode 54 conductive. The same sequence of events is followed for other functions when other levels of the DC control signal are used.

Although a certain preferred embodiment of the invention has been described herein, it is apparent that various changes and modifications can be made therein, for example, by changing the number of gates, the value of bias voltages or the use of other solid state devices instead of gating diodes.

What is claimed is:

1. A remote control system for providing function control by remotely generated direct current control signals transmitted through a wire line, said system including in combination, oscillator means providing an alternating current output, a plurality of control means each responsive to the alternating current output to provide a control function, gate means individually connecting the alternating current output to said control means, means applying different fixed bias potentials to said gate means to hold the same non-conductive, filter means connecting the telephone line to said gate means to apply the direct current control signals thereto, said gate means being individually rendered conductive by a control signal applied thereto of a polarity and value to overcome said bias potential applied thereto to pass the alternating current output to the control means connected thereto, said filter means being connected to said oscillator means at said gate means and preventing transfer of the alternating current output to the telephone line.

2. A remote control system for a radio base station for providing station function control by remotely generated direct current control signals transmitted through a symmetrical telephone line, said system including in combination, oscillator means generating a radio frequency wave and having radio frequency output means and bias output means providing a plurality of different fixed potentials, filter means having first input circuit means coupled to the symmetrical telephone line and an output load having opposite parts and a center tap connected with a reference potential, means coupling said output means to said load to apply said radio frequency wave thereto, said filter means preventing transfer of said radio frequency wave to the telephone line, each part of said output load being responsive to said radio frequency, and to the polarity and value of the direct current control signal, a plurality of gate means coupled between said bias output means and said output load, detector means coupled to said gate means, said gate means being sensitive to a fixed direct current control signal value and polarity and transferring said radio frequency to said detector means when said direct current control signal value overcomes said bias potential for providing a particular control signal output for a particular value and polarity of the telephone line direct current control signal maintaining direct current isolation of the telephone line.

3. A remote control system for a radio base station for providing station function control by remotely generated direct current control signals transmitted through a symmetrical telephone line, said system including in combination, oscillator means generating a radio frequency wave and having radio frequency output means and bias output means providing a plurality of different fixed bias potentials, filter means having first input circuit means coupled to the symmetrical telephone line and an output load having opposite parts and a center tap connected with the reference potential, means for providing a fixed level of said radio frequency wave across said output load, said filter means preventing said radio frequency wave from appearing on external telephone line connections and preventing transfer of said radio frequency wave to the telephone line, each part of said output load being responsive to said radio frequency wave and to the polarity and value of said direct current control signal alternatively, a plurality of gate means parallel coupled between said bias output means and said output load, transformer and rectifier means comprising said gate means, detector means coupled to said gate means, said gate means normally being in back bias state preventing radio frequency energy from flowing through said transformer and rectifier means, said radio frequency detector means operating when the direct current control signal overcomes said bias state and transfers said radio frequency wave to said radio frequency detector means for providing a particular control signal output for a particular value and polarity of the telephone line direct current control signal maintaining direct current isolation of the telephone line.

4. A remote control system for a radio base station for providing station function control by remotely generated direct current control signals transmitted through a symmetrical telephone line, said system including in combination, oscillator means generating a radio frequency wave and having radio frequency output means and bias output means providing a plurality of different fixed bias potentials, filter means having first input circuit means coupled to the symmetrical telephone line and an output load having opposite parts and a center tap connected with a reference potential, means for providing a fixed level of said radio frequency wave across said output load, said filter means preventing said radio frequency wave from appearing on external telephone line connections, each part of said output load being responsive to said radio frequency wave and to the polarity and value of said direct current control signal alternatively, transformer means having a primary and secondary winding, rectifier means and capacitor means, said primary winding, said rectifier, and said capacitor means series coupled between said output load and said reference potential, resistor means coupled between the junction of said primary winding and said capacitor means and said bias output for applying a bias potential to the rectifier means, amplifier and detector means coupled to said secondary winding, said rectifier means being sensitive to a predetermined direct current control signal value and polarity and transferring said radio frequency wave to said amplifier means when said direct current control signal value overcomes said bias potential for providing a particular control signal output for a particular value and polarity of the telephone line direct current control signal maintaining direct current isolation of the telephone line.

5. A remote control system for providing function control by remotely generated direct current control signals transmitted through a wire line, said system including in combination, oscillator means providing an alternating current output, a plurality of control means each responsive to the alternating current output to provide a control function, a plurality of diode gates, filter means having an input connected to the telephone line and an output connected to said diode gates to apply the direct current control signals thereto, means connecting the alternating current output of said oscillator means to said diode gates at said output of said filter means, means applying different fixed bias potentials to said diode gates to hold the same non-conductive, said diode gates being individually rendered conductive by a control signal applied thereto of a polarity and value to overcome said bias potential applied thereto to pass the alternating current output to the control means connected thereto, said filter means preventing transfer of the alternating current output to the telephone line.

6. The system of claim 5 including a plurality of transformer means individually connecting said diode gates to said control means.

References Cited

UNITED STATES PATENTS

| | | | |
|---|---|---|---|
| 2,771,545 | 11/1956 | Doelz | 179—2 |
| 3,038,080 | 6/1962 | Matarese | 340—172 X |
| 3,138,760 | 6/1964 | Gilbert | 328—116 |

ROBERT L. GRIFFIN, *Primary Examiner.*

J. T. STRATMAN, *Assistant Examiner.*